United States Patent
Suzuki et al.

(10) Patent No.: US 11,940,868 B2
(45) Date of Patent: Mar. 26, 2024

(54) INFORMATION ANALYZING APPARATUS, METHOD, AND PROGRAM

(71) Applicant: NIPPON TELEGRAPH AND TELEPHONE CORPORATION, Tokyo (JP)

(72) Inventors: Satoshi Suzuki, Musashino (JP); Haruhisa Nozue, Musashino (JP); Shunsuke Kanai, Musashino (JP); Fumika Asai, Musashino (JP); Naomi Murata, Musashino (JP); Kenichi Tayama, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/641,810

(22) PCT Filed: Sep. 19, 2019

(86) PCT No.: PCT/JP2019/036839
§ 371 (c)(1),
(2) Date: Mar. 9, 2022

(87) PCT Pub. No.: WO2021/053801
PCT Pub. Date: Mar. 25, 2021

(65) Prior Publication Data
US 2022/0327013 A1    Oct. 13, 2022

(51) Int. Cl.
*G06F 11/07* (2006.01)
*G06F 11/00* (2006.01)

(52) U.S. Cl.
CPC ........ *G06F 11/079* (2013.01); *G06F 11/0706* (2013.01); *G06F 11/0793* (2013.01); *G06F 11/008* (2013.01)

(58) Field of Classification Search
CPC .............. G06F 11/008; G06F 11/0706; G06F 11/0709; G06F 11/079; G06F 11/0793
See application file for complete search history.

(56) References Cited

U.S. PATENT DOCUMENTS 7,069,473 B2 *   6/2006   Yasuda ............... G06F 11/0712
                                                      714/37
7,272,531 B2 *   9/2007   Kavaklioglu ......... G06F 3/0482
                                                      702/182

(Continued)

FOREIGN PATENT DOCUMENTS

JP    2006107151 A    4/2006
JP    2008181302 A    8/2008

(Continued)

*Primary Examiner* — Joseph R Kudirka
(74) *Attorney, Agent, or Firm* — Harness, Dickey & Pierce, P.L.C.

(57) ABSTRACT

An information analysis apparatus according to an embodiment includes an input unit that inputs information indicating an apparatus that is a fault occurrence location in a communication network and a factor of a fault, a storage unit that stores a restoration handling method rule in which the apparatus that is the fault occurrence location, the factor of the fault, and an appropriate restoration handling method for the fault are associated, and an analyzer that analyzes an appropriate restoration handling method for the apparatus and the factor indicated by the information that is input, based on information related to a past fault for the apparatus that is the fault occurrence location, or a condition inherent in the apparatus that is the fault occurrence location, from the restoration handling method rule.

5 Claims, 16 Drawing Sheets

(56) References Cited

U.S. PATENT DOCUMENTS

| | | |
|---|---|---|
| 2006/0075156 A1 | 4/2006 | Okaki et al. |
| 2018/0189130 A1* | 7/2018 | Mowry .............. G06F 11/0784 |

FOREIGN PATENT DOCUMENTS

| | | |
|---|---|---|
| JP | 201166522 A | 3/2011 |
| JP | 2019125940 A | 7/2019 |

* cited by examiner

Fig. 4

PAST FAILURE HISTORY INFORMATION DB 43

| APPARATUS (FAULT LOCATION) | FAULT FACTOR | NUMBER OF TIMES OF FAILURE OCCURRENCE | NATURAL RECOVERY EVENT FLAG | REFERENCE VALUE |
|---|---|---|---|---|
| APPARATUS A | FACTOR W | 2 | 0 | - |
| APPARATUS A | FACTOR X | 1 | 0 | - |
| APPARATUS A | FACTOR Y | 3 | 0 | - |
| APPARATUS A | FACTOR Z | 6 | 1 | 5 |
| APPARATUS B | FACTOR Z | 3 | 1 | 5 |
| ... | ... | ... | ... | ... |

Fig. 6

| p (PARAMETER) | SMALL ←——→ USER IMPACT ——→ LARGE | | |
|---|---|---|---|
| NUMBER OF NATURAL RECOVERIES | SMALL | | LARGE |
| APPARATUS TYPE | TERMINAL | SW | SERVER STR |
| APPARATUS VENDOR | COMPANY C | COMPANY B | COMPANY A |
| NW LAYER | LOGICAL/VIRTUAL | | PHYSICAL |
| NW TOPOLOGY | MESH | RING | RUDDER STAR |
| NW POSITION (HIERARCHY) | SMALL BLOCK REPRESENTATIVE | MIDDLE BLOCK REPRESENTATIVE | LARGE BLOCK REPRESENTATIVE |
| WITH OR WITHOUT REDUNDANT SYSTEM | WITH REDUNDANCY, WITHOUT REDUNDANCY | | |
| 0-SYSTEM/1-SYSTEM (WITH REDUNDANCY) | 1-SYSTEM (STANDBY SYSTEM) | | 0-SYSTEM (ACTIVE SYSTEM) |

⇩

| | SMALL ←——→ USER IMPACT ——→ LARGE | | | |
|---|---|---|---|---|
| HANDLING METHOD | WITHOUT HANDLING (WAIT-AND-SEE) | COMMAND EXECUTION | ... | PKG REPLACEMENT ... APPARATUS REPLACEMENT |

Fig. 7

| NUMBER OF PERFORMANCE TIMES OF PAST RESTORATION HANDLING CONSIDERED | APPARATUS TYPE | APPARATUS VENDOR | NW LAYER | NW TOPOLOGY | NW POSITION (HIERARCHY) | WITH OR WITHOUT REDUNDANT SYSTEM | 0-SYSTEM/ 1-SYSTEM |
|---|---|---|---|---|---|---|---|
| 0.1 | 0.1 | 0 | 0.20 | 0.10 | 0.10 | 0.20 | 0.20 |

Fig. 8

| APPARATUS (FAULT LOCATION) | FAULT FACTOR | RESTORATION HANDLING METHOD | OVER-REFERENCE VALUE FLAG |
|---|---|---|---|
| APPARATUS B | FACTOR Z | RESTORATION METHOD P | 0 (NOT EXCEED) |
| APPARATUS B | FACTOR Z | RESTORATION METHOD Q | 1 (EXCEED) |

Fig. 9

| APPARATUS (FAULT LOCATION) | FAULT FACTOR | RESTORATION HANDLING METHOD | USER IMPACT S |
|---|---|---|---|
| APPARATUS A | FACTOR X | RESTORATION METHOD L | $0.75 < S \leqq 1.0$ |
| APPARATUS A | FACTOR X | RESTORATION METHOD M | $0.5 < S \leqq 0.75$ |
| APPARATUS A | FACTOR X | RESTORATION METHOD N | $0.25 < S \leqq 0.5$ |
| APPARATUS A | FACTOR X | RESTORATION METHOD O | $0 \leqq S \leqq 0.25$ |

| FAULT LOCATION | NODE TYPE | FAULT FACTOR | ASSURANCE DEGREE | ALARM (HANDLING) |
|---|---|---|---|---|
| APPARATUS A | Chassis | POWER SUPPLY FAULT | 100.0 | ALARM A, ALARM B |
| ... | ... | ... | | |

Fig. 14

| FAULT LOCATION | FAULT FACTOR | RESTORATION METHOD | ... | (REFERENCE) NUMBER OF PERFORMANCE TIMES OF PAST RESTORATION HANDLING METHOD |
|---|---|---|---|---|
| APPARATUS A | POWER SUPPLY FAULT | Unit REPLACEMENT | ... | 3 |

Fig. 15

| FAULT LOCATION | FAULT FACTOR | RESTORATION METHOD | ... | (REFERENCE) NUMBER OF PERFORMANCE TIMES OF PAST RESTORATION HANDLING METHOD |
|---|---|---|---|---|
| APPARATUS A | LINK FAULT | RESTORATION METHOD L | ... | 2 |
| APPARATUS A | LINK FAULT | RESTORATION METHOD M | ... | 1 |

Fig. 16

| FAULT LOCATION | FAULT FACTOR | RESTORATION METHOD | ... | (REFERENCE) NUMBER OF PERFORMANCE TIMES OF PAST RESTORATION HANDLING METHOD |
|---|---|---|---|---|
| APPARATUS A | LINK FAULT | PKG REPLACEMENT | ... | 5 |

ND ANALYZING APPARATUS,
METHOD, AND PROGRAM

INFORMATION ANALYZING APPARATUS, METHOD, AND PROGRAM

CROSS-REFERENCE TO RELATED APPLICATIONS

This application is a 371 U.S. National Phase of International Application No. PCT/JP2019/036839, filed on Sep. 19, 2019. The entire disclosure of the above application is incorporated herein by reference.

TECHNICAL FIELD

Embodiments of the present disclosure relate to an information analysis apparatus, a method, and a program.

BACKGROUND ART

In related-art restoration handling w % ben a failure occurs in a communication network (hereafter, a network), a restoration handling method is estimated from a failure cause estimated from an alarm at the time of failure occurrence and a type of an apparatus that is a failure location in the network to be presented to a network administrator.

CITATION LIST

Patent Literature

PTL 1: JP 2019-125940 A

SUMMARY OF THE INVENTION

Technical Problem

In the above description, when a failure arising from the same failure location occurs a plurality of times, a suitable restoration handling method may vary depending on the number of times of failure occurrence. However, as described above, in an approach for estimating a restoration handling method from a failure cause and a type of an apparatus that is a failure location in the network, it is impossible to estimate a suitable restoration handling method in accordance with the number of times of failure occurrence described above.

In addition, when a failure arising from a certain type of an apparatus occurs, a suitable restoration handling method may vary depending on a network topology, a position of the apparatus on the network, and the like. However, as described above, in the approach for estimating a restoration handling method from a failure cause and a type of an apparatus that is a failure location in the network, it is impossible to estimate a suitable restoration handling method in accordance with the network topology, the position of the apparatus on the network, and the like described above.

As described above, in the approach for estimating a restoration handling method from a failure cause and a type of an apparatus that is a failure location, it has been impossible to acquire information related to appropriate restoration handling when a failure occurs in a network.

The present disclosure has been made in view of the above circumstances, and an object of the present disclosure is to provide an information analysis apparatus, a method, and a program with which it is possible to acquire information related to appropriate restoration handling when a failure occurs in a network.

Means for Solving the Problem

An information analysis apparatus according to an aspect of the present disclosure includes an input unit that inputs information indicating an apparatus that is a fault occurrence location in a communication network and a factor of the fault, a storage unit that stores a restoration handling method rule in which the apparatus that is the fault occurrence location, the factor of the fault, and an appropriate restoration handling method for the fault are associated, and an analyzer that analyzes an appropriate restoration handling method for the apparatus and the factor indicated by the information that is input, based on information related to a past fault for the apparatus that is the fault occurrence location, or a condition inherent in the apparatus that is the fault occurrence location, from the restoration handling method rule.

An information analysis method according to an aspect of the present disclosure is a method performed by an information analysis apparatus including a storage unit that stores a restoration handling method rule in which an apparatus that is a fault occurrence location in a communication network, a factor of the fault, and an appropriate restoration handling method for the fault are associated, and includes inputting information indicating the apparatus that is the fault occurrence location and the factor of the fault, and analyzing an appropriate restoration handling method for the apparatus and the factor indicated by the information that is input, based on information related to a past fault for the apparatus that is the fault occurrence location, or a condition inherent in the apparatus that is the fault occurrence location, from the restoration handling method rule.

Effects of the Invention

According to the present disclosure, it is possible to acquire information related to appropriate restoration handling when a failure occurs in a network.

BRIEF DESCRIPTION OF DRAWINGS

FIG. 4 is a diagram illustrating an example of past failure history information stored in a past failure history information DB in a table format.

FIG. 6 is a diagram illustrating an example of an impact on a magnitude of a user impact in a table format.

FIG. 7 is a diagram illustrating an example of weight list information of apparatus attribute information stored in an apparatus attribute information weight list DB in a table format.

FIG. 8 is a diagram illustrating an example of a restoration method rule list stored in a restoration method rule list DB in a table format.

FIG. 9 is a diagram illustrating an example of the restoration method rule list stored in the restoration method rule list DB in a table format.

FIG. 14 is a diagram illustrating an example of a notified restoration handling method in a table format.

FIG. 15 is a diagram illustrating an example of a notified restoration handling method in a table format.

FIG. 16 is a diagram illustrating an example of a notified restoration handling method in a table format.

DESCRIPTION OF EMBODIMENTS

Figure 1:
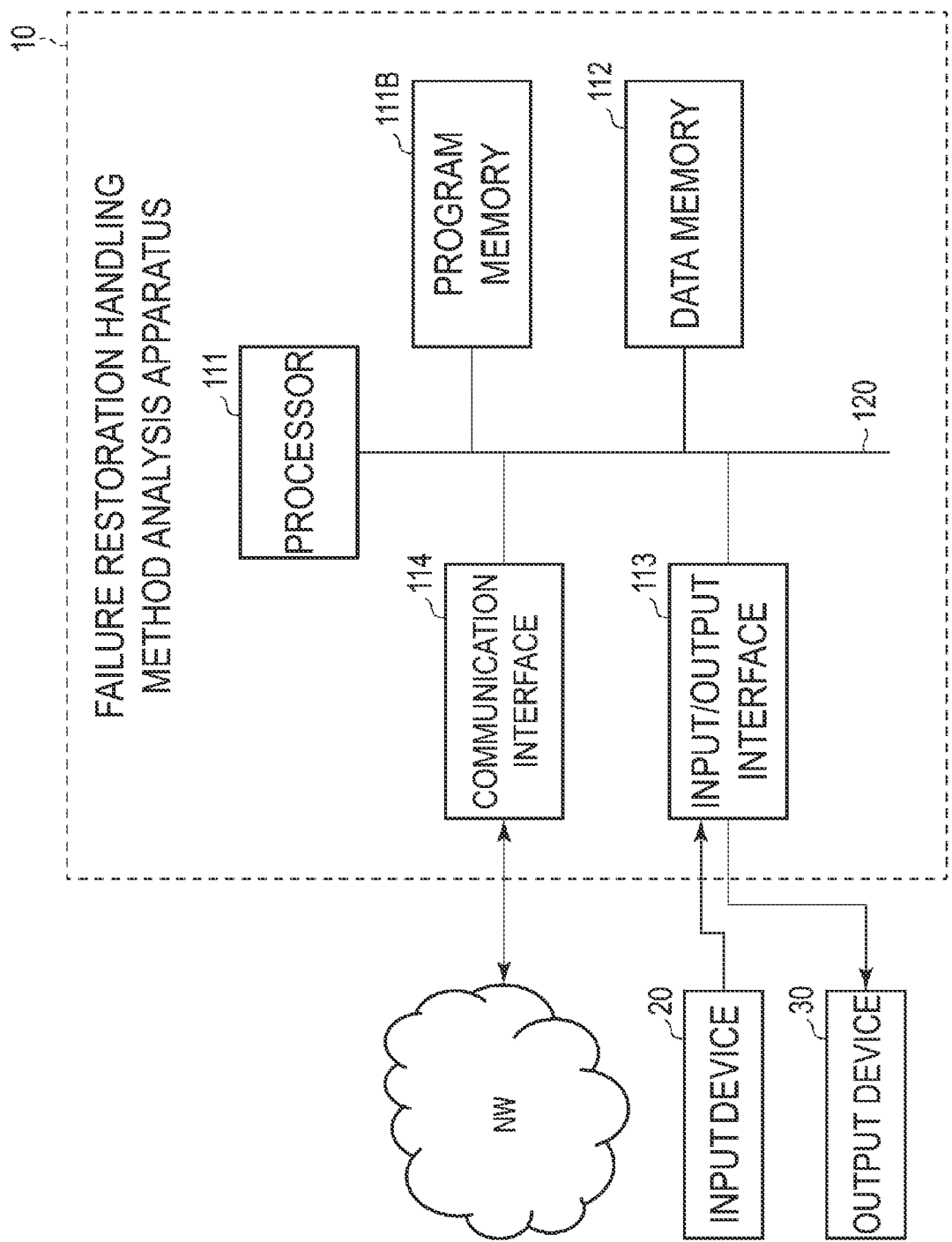
FIG. 1 is a block diagram illustrating an example of a hardware configuration of a failure restoration target method analysis apparatus according to an embodiment of the present disclosure.

Hereinafter, an embodiment according to the present disclosure will be described with reference to drawings.
Configuration
Hardware Configuration FIG. 1 is a block diagram illustrating an example of a hardware configuration of a failure restoration target method analysis apparatus 10 according to an embodiment of the present disclosure.

The failure restoration target method analysis apparatus 10 is constituted by, for example, a server computer or a personal computer, and has a hardware processor 111A such as a central processing unit (CPU). Further, a program memory 111B, a data memory 112, an input/output interface 113, and a communication interface 114 are connected to the hardware processor 111A via a bus 120.

The communication interface 114 includes, for example, one or more wireless communication interface units to allow transmission/reception of information to/from a communication network NW. As the wireless interface, for example, an interface adopting a small power wireless data communication standard such as a wireless local area network (LAN) is used.

An input device 20 and an output device 30 for an administrator provided to the failure restoration target method analysis apparatus 10 is connected to the input/output interface 113. The input/output interface 113 captures operation data input by an administrator through the input device 20 such as a keyboard, touch panel, touchpad, or mouse, and outputs output data to the output device 30 including a display device in which a liquid crystal, an organic electro luminescence (EL), or the like is used to display the output data. Note that as the input device 20 and the output device 30, a device built into the failure restoration target method analysis apparatus 10 may be used, or an input device and an output device of another information terminal capable of performing communication through the network NW may be used.

The program memory 111B is a memory in which a non-volatile memory such as a hard disk drive (HDD) or a solid state drive (SSD) that can be written and read at any time and a non-volatile memory such as a read only memory (ROM) are used in combination as a non-transitory tangible storage medium, in which a program necessary to perform various types of control processing according to an embodiment is stored.

Figure 2:
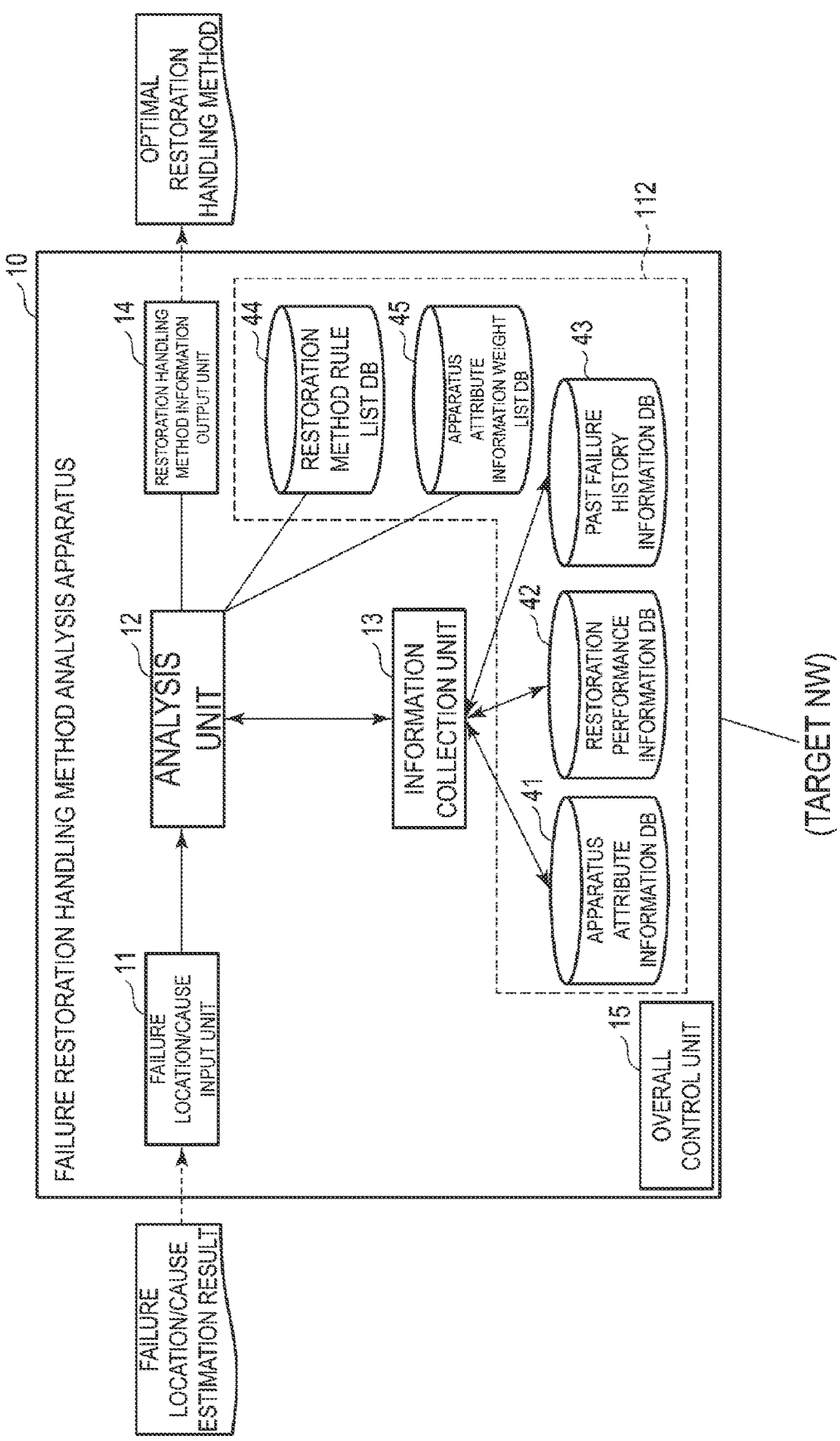
FIG. 2 is a block diagram illustrating an example of a software configuration of the failure restoration target method analysis apparatus according to the embodiment of the present disclosure.

The data memory 112 is a memory in which, for example, the non-volatile memory described above and a volatile memory such as a random access memory (RAM) are used in combination as a tangible storage medium, and is used to store various pieces of data acquired and created in the process of performing information collection processing.
Software Configuration FIG. 2 is a block diagram illustrating an example of a software configuration of the failure restoration target method analysis apparatus 10 according to the embodiment of the present disclosure. In FIG. 2, the software configuration of the failure restoration target method analysis apparatus 10 is illustrated in association with the hardware configuration illustrated in FIG. 1. As illustrated in FIG. 2, the failure restoration target method analysis apparatus 10 according to the embodiment of the present disclosure may be configured as an information analysis apparatus including, as processing function units by software, a failure location/factor input unit 11, an analysis unit 12, an information collection unit 13, a restoration handling method information output unit 14, an overall control unit 15, an apparatus attribute information database (DB) 41, a restoration performance information DB 42, a past failure history information DB 43, a restoration method rule list DB 44, and an apparatus attribute information weight list DB 45. The overall control unit 15 is responsible for overall control of the failure location/factor input unit 11, the analysis unit 12, the information collection unit 13, the restoration handling method information output unit 14, the overall control unit 15, the apparatus attribute information DB 41, the restoration performance information DB 42, the past failure history information DB 43, the restoration method rule list DB 44, and the apparatus attribute information weight list DB 45. Details of each unit will be described below.

The apparatus attribute information DB 41, the restoration performance information DB 42, the past failure history information DB 43, the restoration method rule list DB 44, and the apparatus attribute information weight list DB 45 in the failure restoration target method analysis apparatus 10 illustrated in FIG. 2 may be configured using the data memory 112 illustrated in FIG. 1. However, the apparatus attribute information DB 41, the restoration performance information DB 42, the past failure history information DB 43, the restoration method rule list DB 44, and the apparatus attribute information weight list DB 45 are not essential components in the failure restoration target method analysis apparatus 10, and may be provided in an external storage medium such as a universal serial bus (USB) memory or a storage device such as a database server installed on a cloud.

All processing function units in the respective units of the failure location/factor input unit 11, the analysis unit 12, the information collection unit 13, the restoration handling method information output unit 14, and the overall control unit 15 described above are implemented by causing the aforementioned hardware processor 111A to read and execute a program stored in the program memory 111B. Note that some or all of these processing function units may be implemented by other various forms including an integrated circuit such as an application specific integrated circuit (ASIC) or a field-programmable gate array (FPGA).

Figure 3:
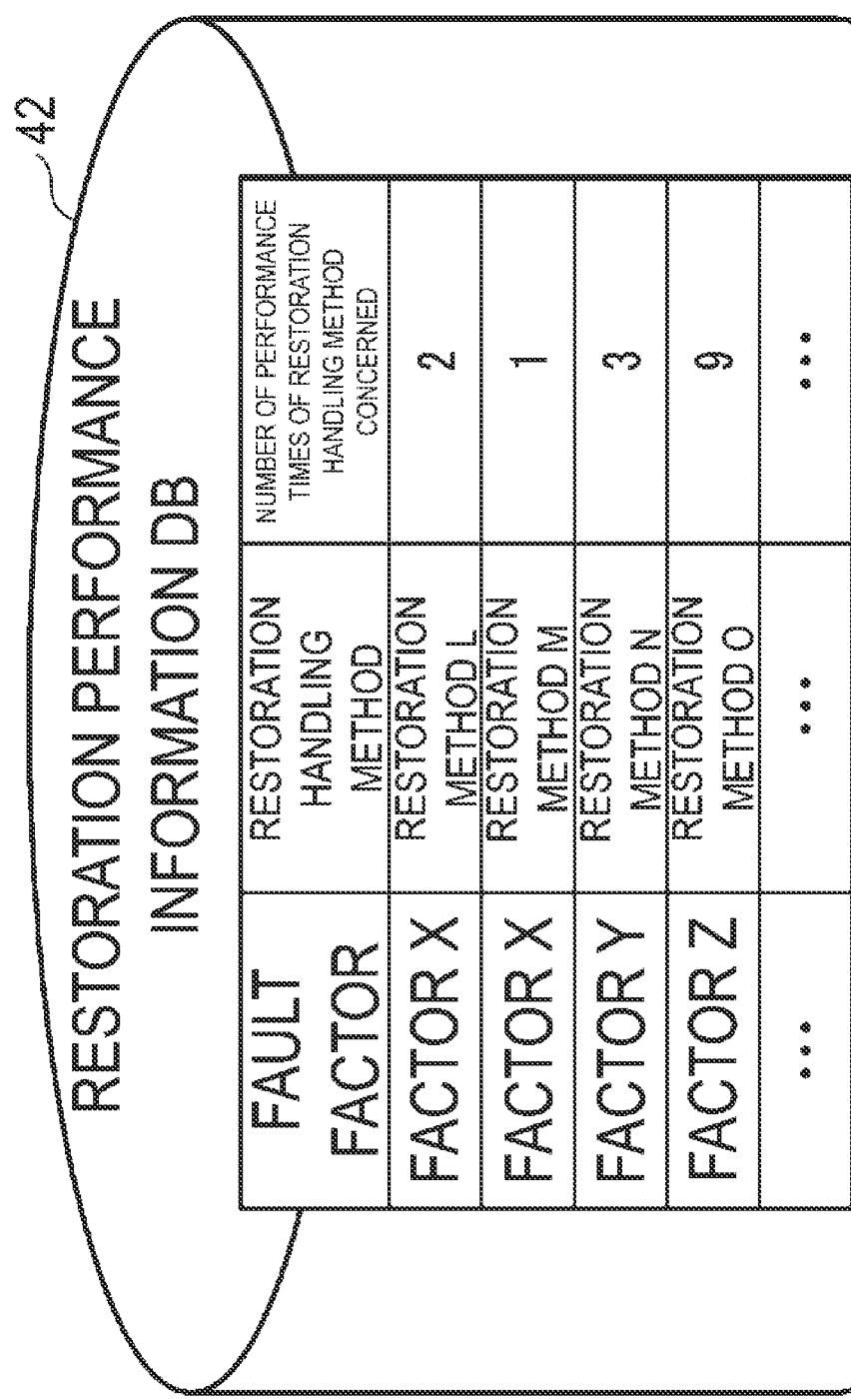
FIG. 3 is a diagram illustrating an example of restoration performance information stored in a restoration performance information DB in a table format.

FIG. 3 is a diagram illustrating an example of restoration performance information stored in the restoration performance information DB in a table format.

As illustrated in FIG. 3, in the restoration performance information stored in the restoration performance information DB 42, there are associated (1) a factor of a fault related to a past network failure, (2) a restoration handling method (sometimes referred to as a restoration method) performed in the past against the fault related to this fault factor, and (3) the number of performance times of this restoration handling method in the past.

For example, in the first row of the restoration performance information illustrated in FIG. 3, it is shown that a restoration method L for a fault related to a fault factor X was performed twice in the past.

FIG. 4 is a diagram illustrating an example of past failure history information stored in the past failure history information DB in a table format.

As illustrated in FIG. 4, in the past failure history information stored in the past failure history information DB 43, there are associated (1) an apparatus name identifying an apparatus that is an occurrence location of a fault related to a past network failure, (2) an occurrence factor of this fault, (3) the number of occurrence times of the network failure due to this factor, (4) a natural recovery event flag indicating whether natural recovery (natural restoration) of the network failure due to the relevant factor is considered, and (5) a reference value of the number of natural recoveries when the relevant natural recovery is considered. The above flag is defined for each type of fault occurrence factors. Examples of the above natural recovery include natural recovery of connection by link up after link down without any particular restoration handling.

Figure 5:
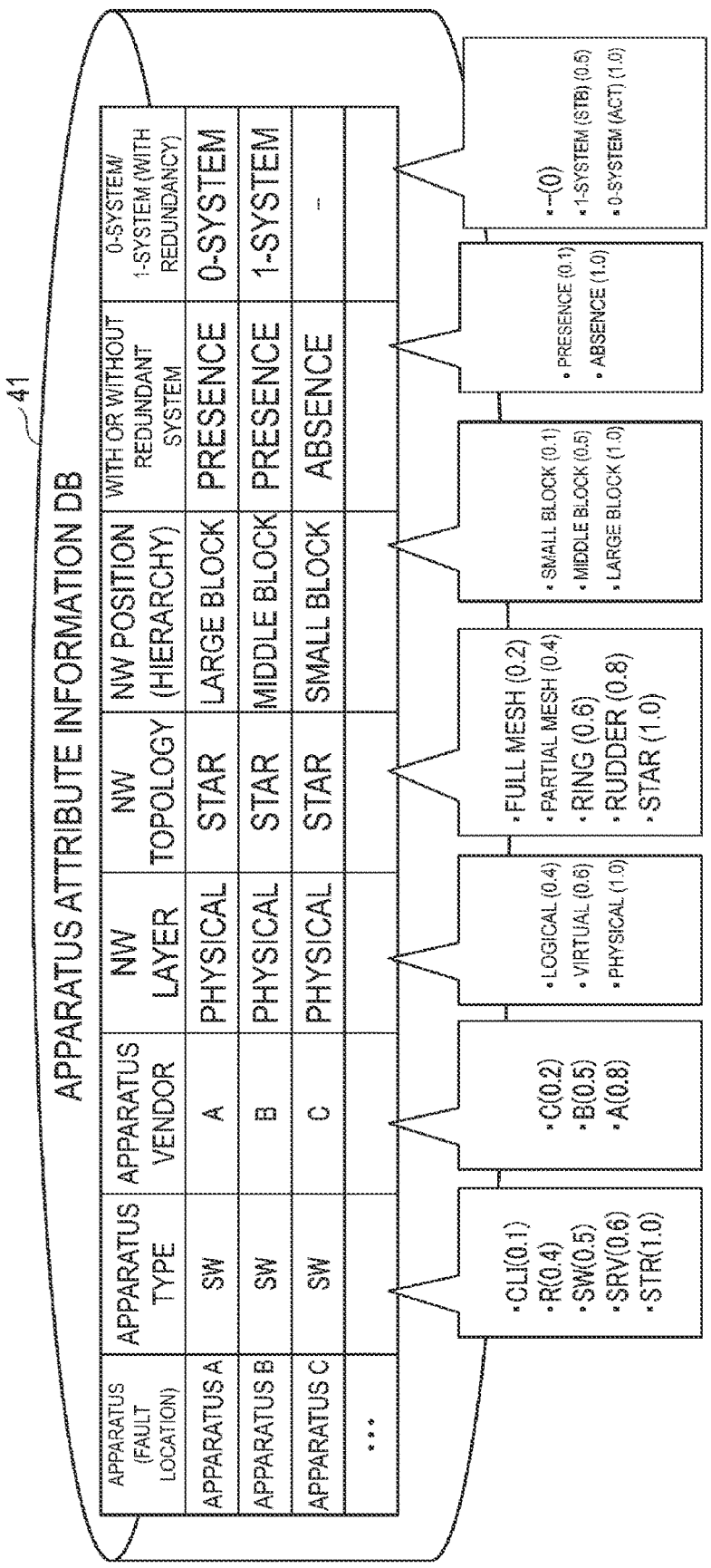
FIG. 5 is a diagram illustrating an example of apparatus attribute information stored in an apparatus attribute information DB in a table format.

FIG. 5 is a diagram illustrating an example of the apparatus attribute information stored in the apparatus attribute information DB in a table format. As illustrated in FIG. 5, in the apparatus attribute information stored in the apparatus attribute information DB 41, there are associated (1) a name of each apparatus disposed in the network, (2) a type of the apparatus, (3) a vendor of the apparatus, (4) a layer type of the network related to the apparatus, (5) a topology of the network related to the apparatus, (6) a position (hierarchy) related to the apparatus on the network, (7) a degree of redundancy of the apparatus, and (8) information indicating a 1-system (standby system) or a 0-system (active system) applicable when the apparatus has redundancy.

Specific examples of storage results of the type of an apparatus in the apparatus attribute information include CLI (client), R (router), SW (network switch), SRV (server), and STR (storage).

Specific examples of storage results of the layer type in the apparatus attribute information include a logical layer, a virtual layer, and a physical layer.

Specific examples of storage results of the topology of a network in the apparatus attribute information include a mesh, a ring, a rudder, and a star.

Specific examples of storage results of the position (hierarchy) on a network in the apparatus attribute information include a small block, a middle block, and a large block.

Specific examples of storage results of the degree of redundancy in the apparatus attribute information include with redundancy and without redundancy.

Specific examples of storage results of the information indicating a 1-system (standby system) or a 0-system (active system) in the apparatus attribute information include blank information when there is no redundancy, and the 1-system (standby system) and the 0-system (active system) when there is redundancy.

As illustrated in FIG. 5, in the apparatus attribute information, a parameter value p, based on which a user impact, which has a value ranging from 0 to 1, is calculated, is defined in accordance with types of the above (2) to (8). Here, it is assumed that the minimum value of the parameter value p is 0 and the maximum value thereof is 1. This parameter value p may be determined in advance and stored in the apparatus attribute information DB 41, or may be calculated each time during analysis processing of a restoration handling method by the analysis unit 12 in accordance with storage results of apparatus attributes.

For example, when a layer of the network related to an apparatus is a logical layer, a parameter value p related to the layer is relatively small, and when a layer of the network related to an apparatus is a physical layer, a parameter value p related to the layer is relatively large.

In addition, in the apparatus attribute information, there is associated the number of times of fault occurrence in the past per fault factor separately detected for each apparatus. The same applies to the number of natural recoveries per fault factor when natural recovery occurs for each apparatus.

FIG. 6 is a diagram illustrating an example of an effect on a magnitude of a user impact in a table format.

The user impact is a value that affects whether a user who is a network administrator should perform a restoration handling method.

A score S of the user impact may be determined by Equation (1) below, based on p' obtained by normalizing the parameter value p (min-max normalization) and a weight w.

[Math. 1]

$$S = \sum_{i=1}^{n}(w_i \times p_i) \qquad \text{Equation (1)}$$

In Equation (1), n is a variable corresponding to the parameter value and the number of weight types. For the various parameter values p' and the various weights w, the minimum value is 0 and the maximum value is 1, and the minimum value of the score S of the user impact is 0 and the maximum value thereof is 1.

When a value of the user impact is relatively large, a necessity of performing a restoration handling method by a user is relatively large, and when the value of the user impact is relatively small, the necessity of performing the restoration handling method by the user is relatively small.

In FIG. 6, a magnitude of an impact on the magnitude of the user impact is illustrated for each of total eight types including the number of natural recoveries and the above (2) to (8) in the apparatus attribute information.

In addition, it is illustrated in FIG. 6 that when a calculated user impact is significantly small, "no handling" (wait-and-see) is selected as a restoration target method and when the user impact becomes larger, a restoration target method to be selected is changed stepwise in order of command execution, package (PKG) replacement, and apparatus replacement.

FIG. 7 is a diagram illustrating an example of weight list information of apparatus attribute information stored in the apparatus attribute information weight list DB in a table format.

As illustrated in FIG. 7, in the weight list information of the apparatus attribute information stored in the apparatus attribute information weight list DB 45, values of weights w for determining the score S of the user impact are shown. In the example illustrated in FIG. 7, there are eight types of weights including consideration of the number of performance times of restoration handling in the past and the above (2) to (8) in the apparatus attribute information. Values of weights of the respective types are dynamically changeable using the input device 20 or the like under a condition where the total value of the values of the weights of the respective types is 1.

As illustrated in FIG. 7, when the consideration of the number of performance times of restoration handling in the past is included in the types of weights, the number of performance times of restoration handling in the past is included in the types of parameter value p. When the number of performance times of restoration handling in the past is relatively small, the parameter value p related to the number of performance times of restoration handling in the past is relatively small, and when the number of performance times of restoration handling in the past is relatively large, the parameter value p related to the number of performance times of restoration handling in the past is relatively large.

FIGS. 8 and 9 are diagrams each illustrating an example of a restoration method rule list stored in the restoration method rule list DB in a table format.

In the example illustrated in FIG. 8, there is illustrated a list of restoration target method rules when the number of natural recoveries is considered.

Specifically, in a list of restoration target method rules when the number of natural recoveries is not considered, there are associated (1) a name of an apparatus that is a fault location, (2) a fault factor related to the apparatus, (3) a restoration handling method selected for the fault, and (4) an over-reference value flag of the number of natural recoveries.

As illustrated in FIG. 8, in an identical apparatus name and an identical fault factor, restoration methods to be selected are different depending on whether the number of natural recoveries exceeds a reference value.

In the example illustrated in FIG. 8, when the name of the apparatus which is a fault location is apparatus B, a fault factor related to the apparatus is factor Z, and the number of natural restorations related to the fault in the past exceeds the reference value, the restoration handling method to be selected is restoration method Q.

On the other hand, when the name of the apparatus which is a fault location is apparatus B similarly, a fault factor related to the apparatus is factor Z similarly, and the number of natural restorations related to the fault in the past does not exceed the reference value, the restoration handling method to be selected is restoration method P.

In the example illustrated in FIG. 9, there is illustrated a list of restoration target method rules when the number of natural recoveries is not considered.

Specifically, in a list of restoration target method rules when the number of natural recoveries is considered, there are associated (1) a name of an apparatus that is a fault location, (2) a fault factor related to the apparatus, (3) a restoration handling method selected for the fault, and (4) a range of a user impact.

As illustrated in FIG. 9, in an identical apparatus name and an identical fault factor, restoration methods to be selected are different depending on a magnitude of the calculated score S of the user impact.

In the example illustrated in FIG. 9, when the name of the apparatus which is a fault location is apparatus A, a fault factor related to the apparatus is factor X, and the score S of the user impact calculated for apparatus A exceeds 0.5 and is 0.75 or less, the restoration handling method to be selected is restoration method M.

On the other hand, when the name of the apparatus which is a fault location is apparatus A similarly, a fault factor related to the apparatus is factor X similarly, and the score S of the user impact calculated for apparatus A exceeds 0.25 and is 0.5 or less, the restoration handling method to be selected is restoration method N.

Figure 10:
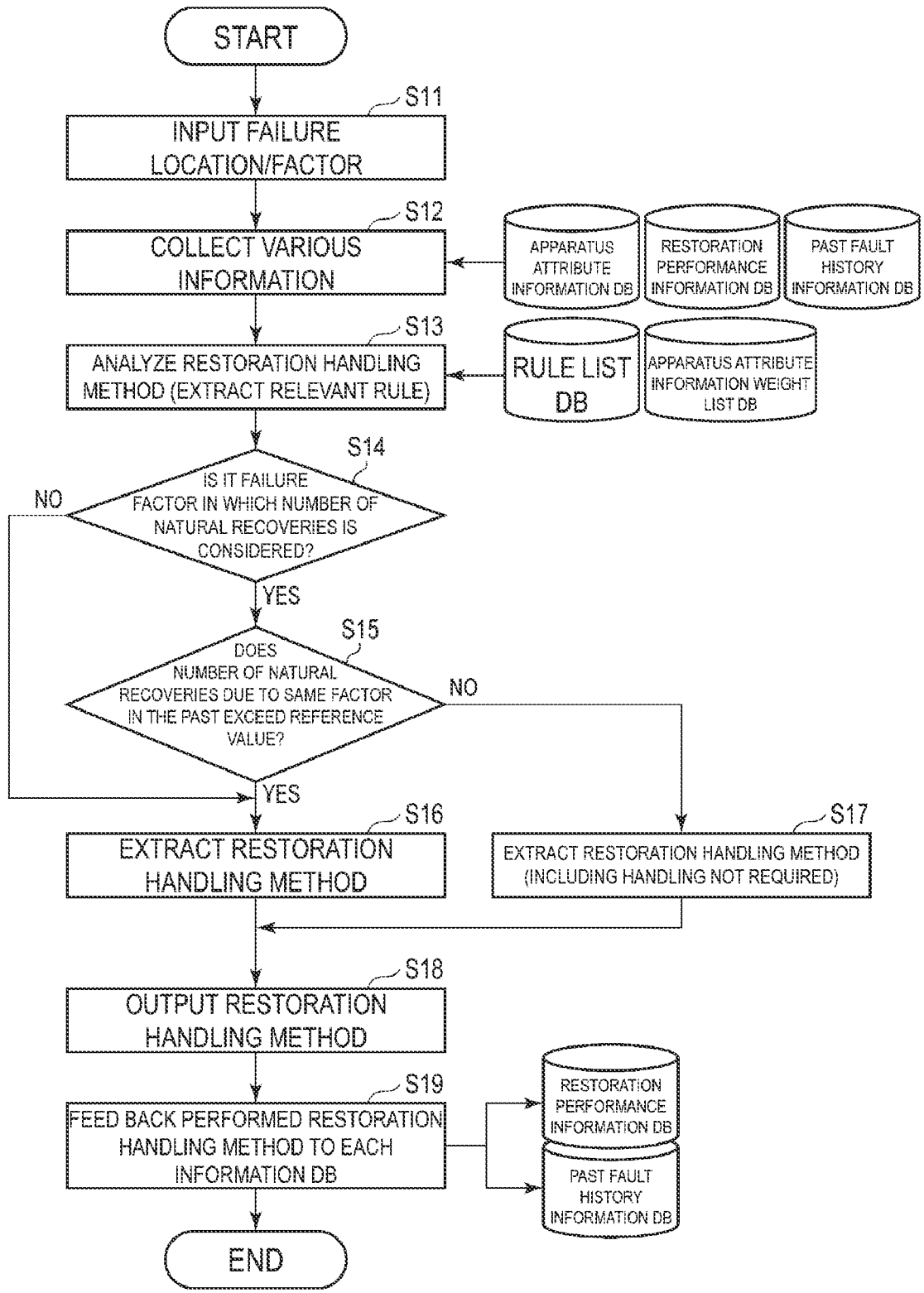
FIG. 10 is a flow chart illustrating an example of processing operations performed by the failure restoration target method analysis apparatus according to the embodiment of the present disclosure.
Figure 11:
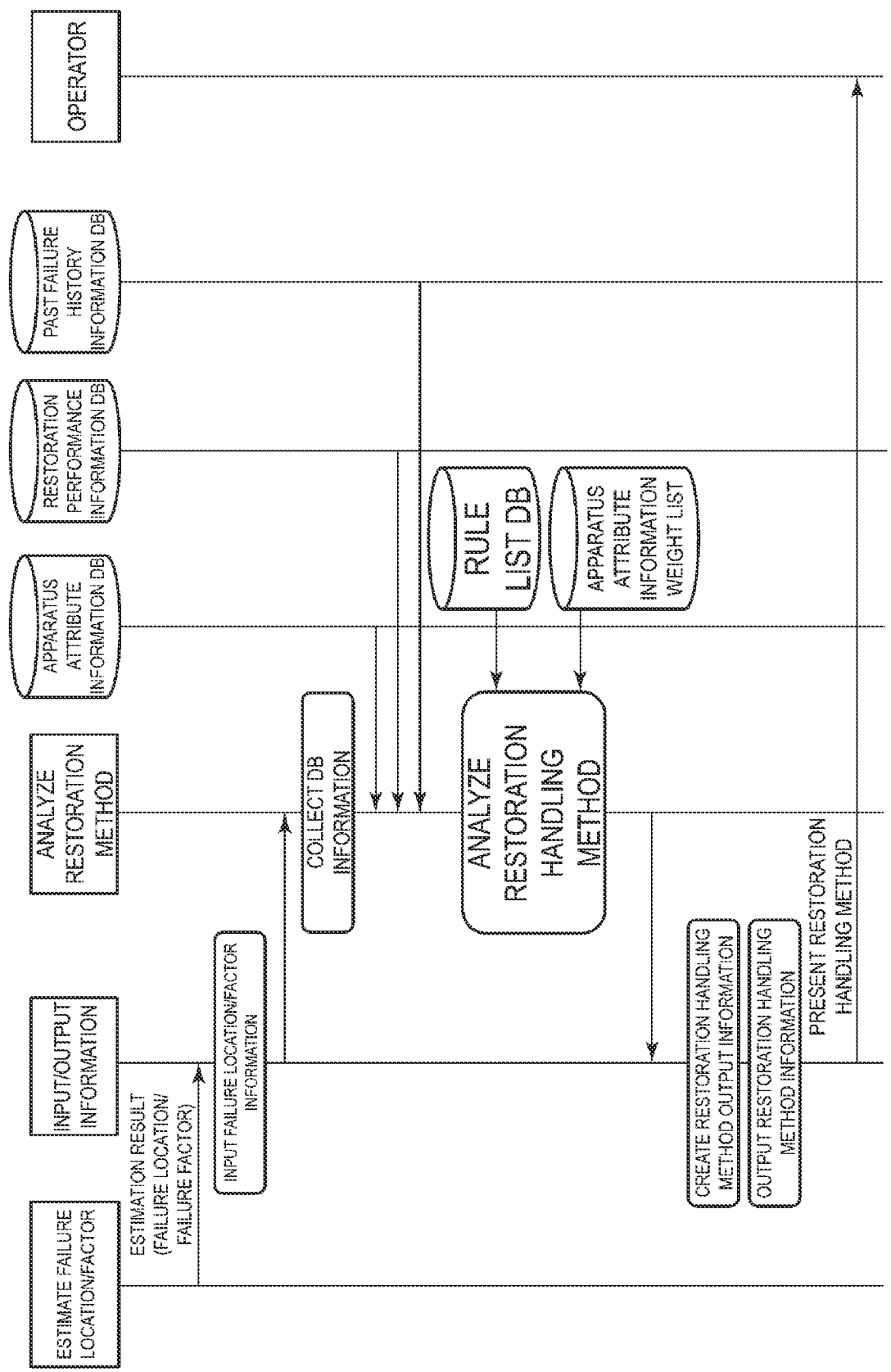
FIG. 11 is a sequence diagram illustrating an example of processing operations performed by the failure restoration target method analysis apparatus according to the embodiment of the present disclosure.

FIG. 10 is a flowchart illustrating an example of processing operations of the failure restoration target method analysis apparatus 10 according to the embodiment of the present disclosure. FIG. 11 is a sequence diagram illustrating an example of processing operations of the failure restoration target method analysis apparatus 10 according to the embodiment of the present disclosure.

First, the failure location/factor input unit 11 inputs, via the input device 20 or the like, an estimation result list including a name of an apparatus which is a fault occurrence location related to a newly generated network failure and an estimation result of the fault factor (S11). The fault occurrence location and the estimation result of the fault factor may be results estimated by visual inspection by a network administrator or the like, or may be results estimated by a known technique.

Figure 12:
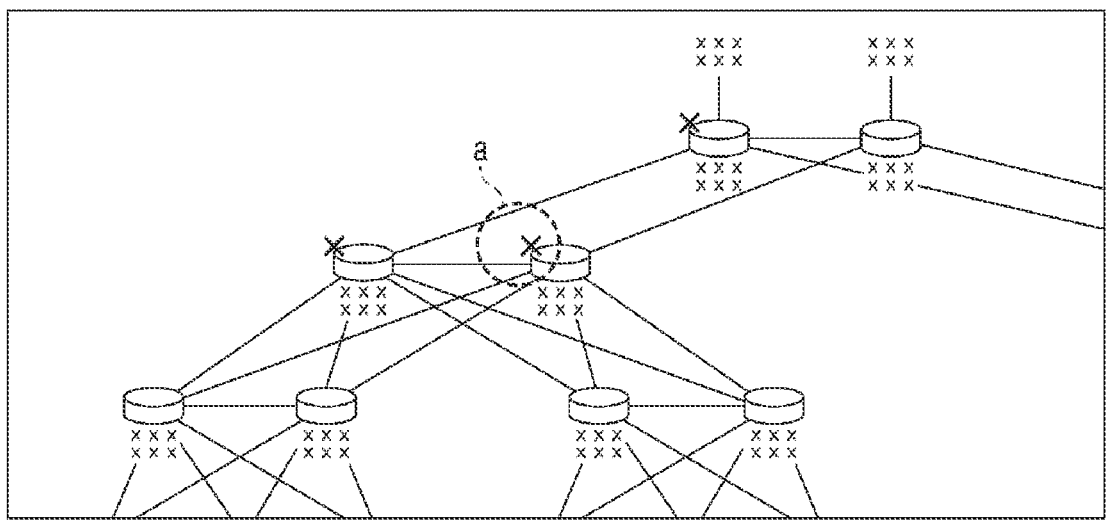
FIG. 12 is a diagram illustrating an example of a display screen of a failure location estimation result.

FIG. 12 is a diagram illustrating an example of a display screen of a failure location estimation result.

As illustrated in FIG. 12, the failure location estimation result is displayed via the output device 30. In this FIG. 12, the fault location is an apparatus adjacent to an x mark surrounded by a in FIG. 12.

Figure 13:
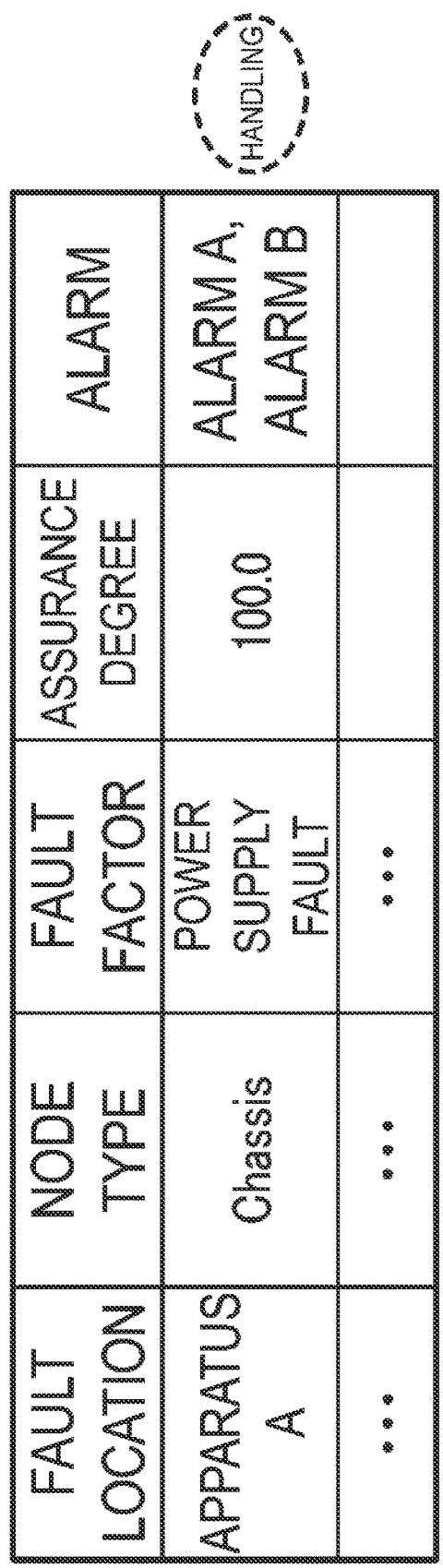
FIG. 13 is a diagram illustrating an example of a display screen of an estimation result list.

FIG. 13 is a diagram illustrating an example of a display screen of the estimation result list.

When the x mark surrounded by a in FIG. 12 is selected by the input device 20, the failure location estimation result is displayed via the output device 30, as illustrated in FIG. 13. As illustrated in FIG. 13, the estimation result input at S1 may include a node type of an apparatus that is a fault occurrence location, an assurance degree of the fault, and a type of alarm associated with the fault.

When an icon "handling" illustrated in FIG. 13 is selected by the input device 20, subsequent processing by the analysis unit 12 is started.

The analysis unit 12 sends an instruction of information collection to the information collection unit 13. In accordance with this instruction, among the apparatus attribute information stored in the apparatus attribute information DB 41, the restoration performance information stored in the restoration performance information DB 42, and the past failure history information stored in the past failure history information DB 43, the information collection unit 13 collects information related to the name of the apparatus that is the fault occurrence location and the fault factor input in S11, and sends the collected information to the analysis unit 12 (S12).

Next, in order to analyze a restoration handling method, of the restoration method rule list stored in the restoration method rule list DB 44, the analysis unit 12 collects rules related to the name of the apparatus that is the fault occurrence location and the fault factor input in S11, and collects the weight list information of the apparatus attribute information stored in the apparatus attribute information weight list DB 45 (S13).

The analysis unit 12 compares the fault factor input in S11 with the past failure history information collected in S12 to determine whether the fault factor input in S11 is a factor in which the number of natural recoveries is considered (S14).

In this S14, when the fault factor input in S11 is a factor in which the number of natural recoveries is considered, that is, when the natural recovery event flag corresponding to the fault factor input in S11 is "1" (Yes in S14), the analysis unit 12 compares the fault factor input in S11 with the past failure history information and the apparatus attribute information collected in S12. In this way, the analysis unit 12 determines whether the current number of natural recoveries for the fault due to the same fault occurrence location and the same fault factor exceeds a reference value in the past failure history information (S15).

In this S15, when it is determined that the number of natural recoveries of the fault due to the same fault occurrence and the same fault factor exceeds the reference value in the past failure history information, that is, when it is determined that the number of the natural recoveries exceeds the reference value corresponding to the natural recovery event flag "1" corresponding to the fault factor input in S1 (Yes in S15), the analysis unit 12 extracts a restoration target method corresponding to the name of the apparatus and the fault factor input at S11, and an over-reference value flag "1", in the restoration target method rule, which is stored in the restoration method rule list DB 45, when the number of natural recoveries is considered (S16). The restoration target method to be extracted here is, for example, restoration method Q illustrated in FIG. 8.

On the other hand, when it is determined to be NO in S15, the analysis unit 12 extracts a restoration target method corresponding to the name of the apparatus and the fault factor input at S11, and the over-reference value flag "0", in the restoration target method rule, which is stored in the restoration method rule list DB 45, when the number of natural recoveries is considered (S17). The restoration target method to be extracted here is, for example, restoration method P English Translation of indicating that no special handling is required (which may be defined as "handling not required"), as illustrated in FIG. 8.

Also, in S14 described above, when the fault factor input at S11 is a factor in which the number of natural recoveries is not considered, that is, when the natural recovery event flag corresponding to the fault factor input in S11 is "0" (No in S14), based on the apparatus attribute information stored in the apparatus attribute information DB 44 and the weight list information of the apparatus attribute information stored in the apparatus attribute information weight list DB 45, the analysis unit 12 calculates the score S of the user impact related to the apparatus name input in S11.

Then, the analysis unit 12 extracts a restoration target method corresponding to the name of the apparatus and the fault factor input in S11, and the calculated score S of the user impact, in the restoration target method rule, which is stored in the restoration method rule list DB 45, when the number of natural recoveries is not considered (S14→S16). The restoration handling method to be extracted here is a restoration method corresponding to the calculated score S among restoration methods L, M, N, and O illustrated in FIG. 9, for example.

Also, in this processing, among restoration target methods that correspond to the name of the apparatus and the fault factor input at S11, and the calculated score S of the user impact, a restoration handling method that does not correspond to the calculated score S may be extracted together for reference by a user.

Next, the restoration handling method information output unit 14 outputs the restoration handling method extracted in S16 or S17 in a format that is visible to the user via the output device 30 as an optimal restoration handling method corresponding to the estimation result input in S11 (S18).

FIGS. 14, 15, and 16 are diagrams each illustrating an example of a notified restoration handling method in a table format. The example illustrated in FIG. 14 is a notification result of a restoration handling method when only one restoration handling method, here, unit replacement is extracted in a case where a fault location is apparatus A and a fault factor is a power supply fault.

The example illustrated in FIG. 15 is a notification result of a plurality of restoration handling methods corresponding to an apparatus and a factor when the fault location is apparatus A, the fault factor is a link fault, and this factor is a factor in which the number of natural recoveries is not considered. In this notification result, a restoration handling method corresponding to the calculated score S of the user impact is displayed at the top row and restoration handling methods not corresponding thereto are displayed in other rows.

When there are a plurality of restoration handling methods not corresponding thereto, the methods are arranged in descending order of the number of performance times of the restoration method in the restoration performance information stored in a restoration performance method DB 42, as illustrated in FIG. 15.

The example illustrated in FIG. 16 is a notification result of a restoration handling method when only one restoration handling method, here, unit replacement is extracted in a case where a fault location is apparatus A, a fault factor is a link fault, and the factor is a factor in which the number of natural recoveries is considered.

Then, when a restoration performance method output in S18 is performed, the analysis unit 12 recognizes this performance by an operation to the input device 20 or the like. The analysis unit 12 feeds back information related to the performed restoration performance method to the restoration performance information stored in the restoration performance method DB 42 and the past failure history information stored in the past failure history information DB 43 via the information collection unit 13 (S19).

In addition, in a case of an input fault factor in which the number of natural recoveries is considered, as a result of processing by the analysis unit 12, when the number of natural recoveries in the past is less than the reference value, a message indicating handling is not required or the like is displayed via the output device 30.

As described above, to the failure restoration target method analysis apparatus according to the embodiment of the present disclosure, information indicating an apparatus that is a fault occurrence location in a communication network and a fault factor is input. Then, the failure restoration target method analysis apparatus analyzes an appropriate restoration handling method for the apparatus and the factor indicated by the input information based on the restoration handling method rule and based on information related to a past fault for the apparatus that is a fault occurrence location or a condition inherent in the apparatus that is a fault occurrence location.

In this way, for example, in response to the number of occurrence times of the fault due to the same apparatus/ factor in the past, the failure restoration target method analysis apparatus can extract an appropriate restoration handling method for the fault due to the apparatus/factor and present the extracted method to the user.

In addition, for example, in response to an apparatus type, a vendor, a layer, a network topology, a position on the network, and the like which are conditions inherent in an apparatus that is a fault occurrence location, the failure restoration target method analysis apparatus can extract an appropriate restoration handling method for the fault due to the apparatus/factor and present the extracted method to the user.

As described above, the failure restoration target method analysis apparatus extracts and presents a restoration handling method to a user, so that it is possible to reduce a period of time required to determine an appropriate restoration handling method and reduce operations until this determination.

In addition, an appropriate restoration handling method is determined based on the restoration handling method rule, and thus variations in handling by network administrators can be reduced.

Furthermore, an approach described in each embodiment can be stored in a recording medium such as a magnetic disk (a Floppy (trade name) disk, a hard disk, or the like), an optical disc (a CD-ROM, a DVD, an MO, or the like), or a semiconductor memory (a ROM, a RAM, a flash memory, or the like), for example, or transferred and distributed by a communication medium, as a program (a software unit) that can be executed by a calculator (computer). The program stored in the medium also includes a setting program incorporating a software unit (including not only an execution program but also a table or data structure), which will be executed in a calculator, into the calculator. A calculator actualizing the present apparatus executes the above-described processing by loading the program recorded on the recording medium or constructing a software unit using the setting program in some cases, and controlling an operation using the software unit. Note that the recording medium referred to herein is not limited to a recording medium for distribution but includes a storage medium such as a magnetic disk or a semiconductor memory provided in the calculator or a device connected thereto via a network.

It is to be noted that the present disclosure is not limited to the aforementioned embodiments and can be variously modified in the implementation stage without departing from the gist of the present disclosure. An appropriate combination of the embodiments can also be implemented, in which a combination of their effects can be obtained. Further, the above embodiments include various disclosures, which can be designed by combining constituent elements selected from a plurality of constituent elements disclosed here. For example, a configuration in which some constituent elements are removed from all the constituent elements shown in the embodiments can be designed as an disclosure if the problems can be solved and the effects can be achieved.

REFERENCE SIGNS LIST

10 Failure restoration target method analysis apparatus
11 Failure location/factor input unit
12 Analysis unit
13 Information collection unit
14 Restoration handling method information output unit
15 Overall control unit

The invention claimed is:
1. An information analysis apparatus comprising:
a processor; and
a non-transitory computer medium having computer program instructions stored thereon, wherein the instructions are executable by the processor and perform to:
input information indicating a first apparatus that is a fault occurrence location in a communication network and a factor of the fault;
store a restoration handling method rule where the first apparatus that is the fault occurrence location, the factor of the fault, and an appropriate restoration handling method for the fault are associated; and
analyze an appropriate restoration handling method for the first apparatus and the factor indicated by the information that is input, based on information related to a past fault for the first apparatus that is the fault occurrence location, or a condition inherent in the first apparatus that is the fault occurrence location, from the restoration handling method rule;
wherein:
the information related to the past fault includes a number of past natural recoveries at a time of occurrence of the past fault,
the restoration handling method rule is a first restoration handling method rule where the first apparatus that is the fault occurrence location, the factor of the fault, a condition related to the number of the past natural recoveries, and the appropriate restoration handling method for the fault are associated,
the instructions further perform to analyze the appropriate restoration handling method for the first apparatus and the factor from the first restoration handling method rule based on a magnitude of the number of the past natural recoveries,
when the appropriate restoration handling method is performed, the performance is recognized by an operation that is fed back to be included as input information, and
the appropriate restoration handling method includes a package replacement, an apparatus replacement or a combination thereof.

2. The information analysis apparatus according to claim 1, wherein
the condition inherent in the first apparatus that is the fault occurrence location, the condition being stored, includes at least one of a type of the apparatus, a vendor of the first apparatus, a layer type related to the first apparatus, a topology of a network where the first apparatus is installed, a hierarchy of the network where the first apparatus is installed, or presence or absence of redundancy related to the first apparatus,
wherein the instructions further perform to calculate a score indicating a magnitude of an impact on a restoration handling method for the fault that is occurred based on the condition inherent in the first apparatus that is the fault occurrence location, the restoration handling method rule is a second restoration handling method rule where the first apparatus that is the fault occurrence location, the factor of the fault, a condition related to the score, and the appropriate restoration handling method for the fault are associated, and
wherein the instructions further perform to analyze the appropriate restoration handling method for the first apparatus and the factor from the second restoration handling method rule based on the score that is calculated.

3. The information analysis apparatus according to claim 2, wherein the instructions further perform to: calculate the score by multiplying a parameter value corresponding to a storage result of the condition inherent in the first apparatus that is the fault occurrence location by a value of weighting corresponding to a type of the condition.

4. An information analysis method performed by an information analysis apparatus comprising a storage unit configured to store a restoration handling method rule where a first apparatus that is a fault occurrence location in a communication network, a factor of the fault, and an appropriate restoration handling method for the fault are associated, the method comprising:

inputting information indicating the first apparatus that is the fault occurrence location and the factor of the fault;

analyzing an appropriate restoration handling method for the first apparatus and the factor indicated by the information that is input, based on information related to a past fault for the first apparatus that is the fault occurrence location, or a condition inherent in the first apparatus that is the fault occurrence location, from the restoration handling method rule;

wherein:

the information related to the past fault includes the number of past natural recoveries at a time of occurrence of the past fault, the restoration handling method rule is a first restoration handling method rule where the first apparatus that is the fault occurrence location, the factor of the fault, a condition related to the number of the past natural recoveries, and the appropriate restoration handling method for the fault are associated, the analyzing includes analyzing the appropriate restoration handling method for the first apparatus and the factor from the first restoration handling method rule based on a magnitude of the number of the past natural recoveries; and performing the appropriate restoration handling method for the first apparatus, and wherein the appropriate restoration handling method includes a package replacement, an apparatus replacement or a combination thereof.

5. The information analysis method according to claim 4, wherein the condition inherent in the first apparatus that is the fault occurrence location, the condition being stored in the storage unit, includes at least one of a type of the apparatus, a vendor of the first apparatus, a layer type related to the first apparatus, a topology of a network where the first apparatus is installed, a hierarchy of the network where the first apparatus is installed, or presence or absence of redundancy related to the first apparatus, the analyzing includes calculating a score indicating a magnitude of an impact on a restoration handling method for the fault that is occurred based on the condition inherent in the first apparatus that is the fault occurrence location, the restoration handling method rule is a second restoration handling method rule where the first apparatus that is the fault occurrence location, the factor of the fault, a condition related to the score, and the appropriate restoration handling method for the fault are associated, and the analyzing includes analyzing the appropriate restoration handling method for the first apparatus and the factor from the second restoration handling method rule based on the score that is calculated.

* * * * *